Figure 1:
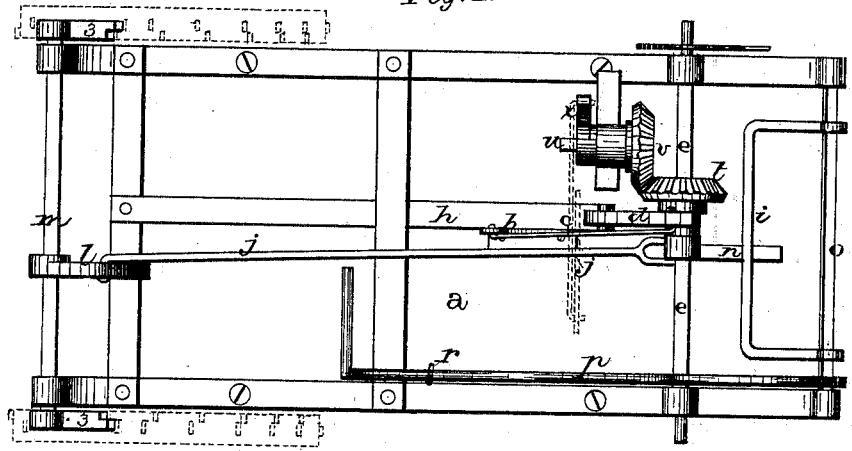
Figure 2:
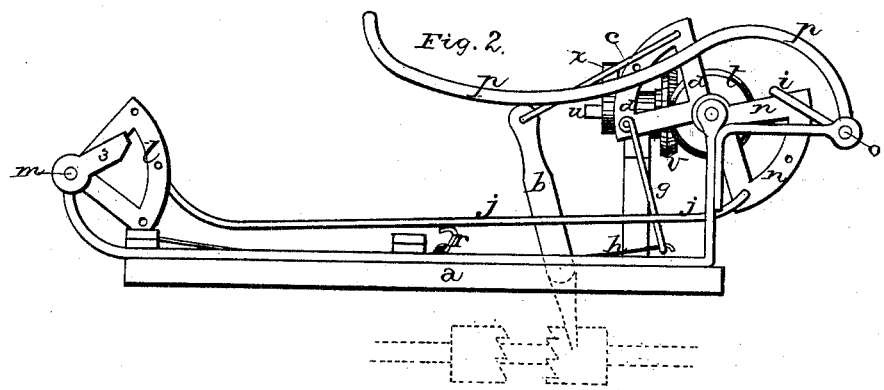

J. DUSCH & H. LEWIS.
Harvester.

No. 201,759. Patented March 26, 1878.

WITNESSES.
Wm Garner
Will H. Kerr

INVENTORS.
Jno. Dusch,
Henry Lewis.
per
F. A. Lehmann, Atty.

UNITED STATES PATENT OFFICE.

JOHN DUSCH AND HENRY LEWIS, OF BAY CITY, ILLINOIS.

IMPROVEMENT IN HARVESTERS.

Specification forming part of Letters Patent No. 201,759, dated March 26, 1878; application filed December 3, 1877.

*To all whom it may concern:*

Be it known that we, JNO. DUSCH and HENRY LEWIS, of Bay City, in the county of Pope and State of Illinois, have invented certain new and useful Improvements in Attachments to Mowing and Reaping Machines; and we do hereby declare the following to be a full, clear, and exact description of the invention, such as will enable others skilled in the art to which it pertains to make and use it, reference being had to the accompanying drawings, which form part of this specification.

Our invention relates to an attachment to mowing and reaping machines; and it consists in the arrangement and combination of devices that will be more fully described hereinafter, whereby, should the driver be accidentally thrown from his seat, brakes or locks will be instantly and automatically applied to the wheels so as to stop the horses.

The accompanying drawings represent our invention.

$a$ represents the platform of a mowing or reaping machine, and $b$ the gearing-lever. The lower end of this lever is connected to any of the well-known gearing devices, so that the driver can throw the machine in and out of gear at will. By moving this lever backward, the machine is thrown in gear, ready for operation. Connected to the upper end of this lever is a connecting-rod, $c$, the front end of which is fastened to the segment $d$, which segment is placed upon the square shaft $e$, and is connected at its lower end, by means of the loop $g$, with the flat spring $h$.

Upon the square shaft is placed a second segment, $n$, turned in the opposite direction, the upper side of which bears up against the under side of the driver's seat $i$, while the lower corner is fastened, by means of the connecting-rod $j$, with the segment $l$ on the shaft $m$. When the weight of the driver is placed upon the seat, the segment $n$ is forced downward, thereby turning the square shaft $e$ partially around and forcing the segment $d$ forward.

As the segment $d$ moves forward, drawing the end of the spring upward and pulling the upper end of the gearing-lever backward, the machine is thrown into gear, ready for operation. As soon as the driver rises from the seat, or is thrown from it accidentally, the spring $h$ instantly pulls the segment $d$ downward, thereby forcing the upper end of the gearing-lever forward, when the brakes 3 will be instantly applied to the wheels, so that the machine will be instantly stopped.

The seat $i$ is fastened to the shaft $o$, to one end of which is secured the long curved lever $p$, which serves to force the seat downward, and thereby throw the machine into gear. Should the driver desire to walk, he has but to fasten the forward end of this lever down by means of a small hook or catch, $r$, when the machine will be held in gear in the same manner as if the driver were sitting upon his seat.

When the driver is not upon his seat, or the long lever fastened down by the hook $r$, it will be seen that the segment $l$ falls backward and strikes against the frame of the platform; but when the seat is pressed downward this segment $l$ is raised upward into the position shown, and thereby revolves the shaft to which it is secured sufficiently far around to throw the brakes or locks 3 upon its ends upward and off the wheels.

Where the machine gears across the platform, upon the square shaft $e$, just beside the segment, will be placed the beveled gear $t$, which meshes with a similar gear, $v$, placed upon the rear end of the short shaft $u$. To the front end of this shaft is secured an arm, $x$, to the upper end of which, by means of a connecting-rod, it is attached to the gearing-lever. In gearing across the platform, the lever will be turned, as shown in dotted lines, so that it may be connected directly with the arm $x$.

The connecting-rod to the gearing-lever may be detached or unhooked, thereby leaving only the brakes to be worked; or, if so desired, the connecting-rod to the lever may be removed so as not to be in the way.

We are aware that the idea of connecting the driver's seat with devices for applying brakes to the wheels is not broadly new, and we do not therefore broadly claim such; but,

Having thus described our invention, we claim—

1. The combination of the lever $p$, shaft $o$, seat $i$, segments $d\ n\ l$, rods $c\ j$, shafts $e\ m$, and brakes, substantially as shown.

2. The combination of the three segments, gearing-lever, connecting-rods, driver's seat, and brakes, substantially as described.

In testimony that we claim the foregoing we have hereunto set our hands.

JOHN DUSCH.
HENRY LEWIS.

Witnesses:
   THOS. J. HENSON,
   THOMAS NEELY.